United States Patent [19]
Bauer, Sr.

[11] 3,993,260
[45] Nov. 23, 1976

[54] SELECTIVELY UNWINDING FILM REEL
[76] Inventor: William Arthur Bauer, Sr., 53 B-Bar-B, Quarry Road, Amherst, Ohio 44001
[22] Filed: Nov. 10, 1975
[21] Appl. No.: 630,209

Related U.S. Application Data
[63] Continuation-in-part of Ser. No. 442,758, Feb. 14, 1975, abandoned.

[52] U.S. Cl............................. 242/55.18; 242/71.8
[51] Int. Cl.$^2$............................................. B65H 17/48
[58] Field of Search............... 242/55.18, 55, 71.8, 242/77; 352/128

[56] References Cited
UNITED STATES PATENTS

| | | | |
|---|---|---|---|
| 1,024,790 | 4/1912 | Lake | 242/55.18 |
| 1,144,693 | 6/1915 | Delaney | 242/55.18 |
| 1,426,290 | 8/1922 | Gottschau | 242/55.18 |
| 1,946,604 | 2/1934 | Wittel | 242/55.18 X |

*Primary Examiner*—Edward J. McCarthy
*Attorney, Agent, or Firm*—Bosworth, Sessions & McCoy

[57] ABSTRACT
A reel assembly for feeding, receiving and storing flexible strip material such as motion picture film. The reel is adapted to be mounted on the feed or take up spindles for a movie projector and permits film wound on the reel to be unwound either from the outside of the film windings or from the inside. The reel assembly includes a hub with an integral radial flange at one side and a removable cover that fits over the hub and flange and surrounds the hub and the strip material wound thereon. A movable or free annular side plate is adapted to be retained by the cover opposite the radial flange. Located within the hub is a film extraction drum slidably received for axial movement between a retracted detent position within the hub and an axially extended position partially outside of the hub and extending through a central opening in the free side plate. The extraction drum has a fastening means thereon that is connectable to the tail end or inside end of film wound on the hub and which extends radially through a slot in the hub. When the extraction drum is moved axially outward to its extended position, it slides the tail end of the film strip laterally off of the hub so that the film strip may be unwound from the inside out while passing through the central opening in the free side plate. Thus, the film strip may be threaded through a movie projector and continuously fed even though it is unwinding unconventionally from the inside out.

5 Claims, 9 Drawing Figures

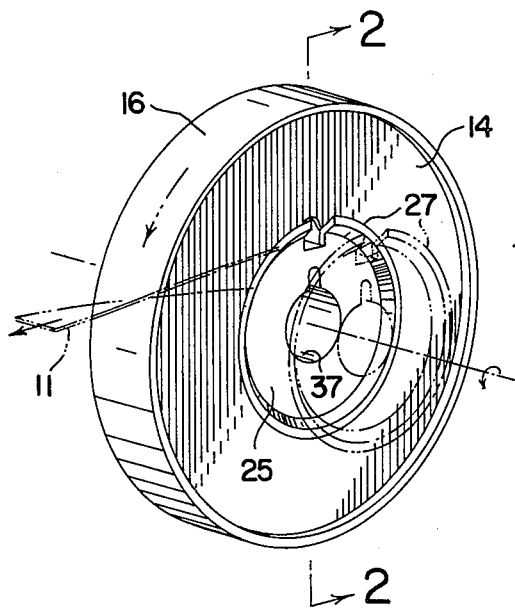
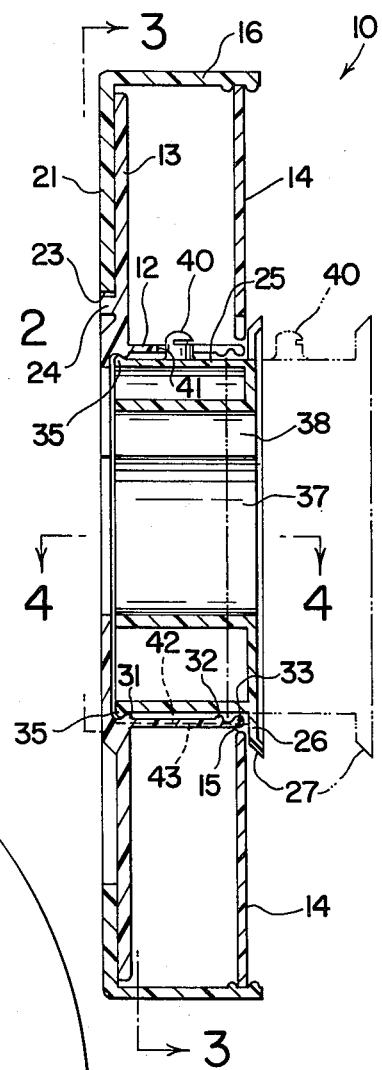
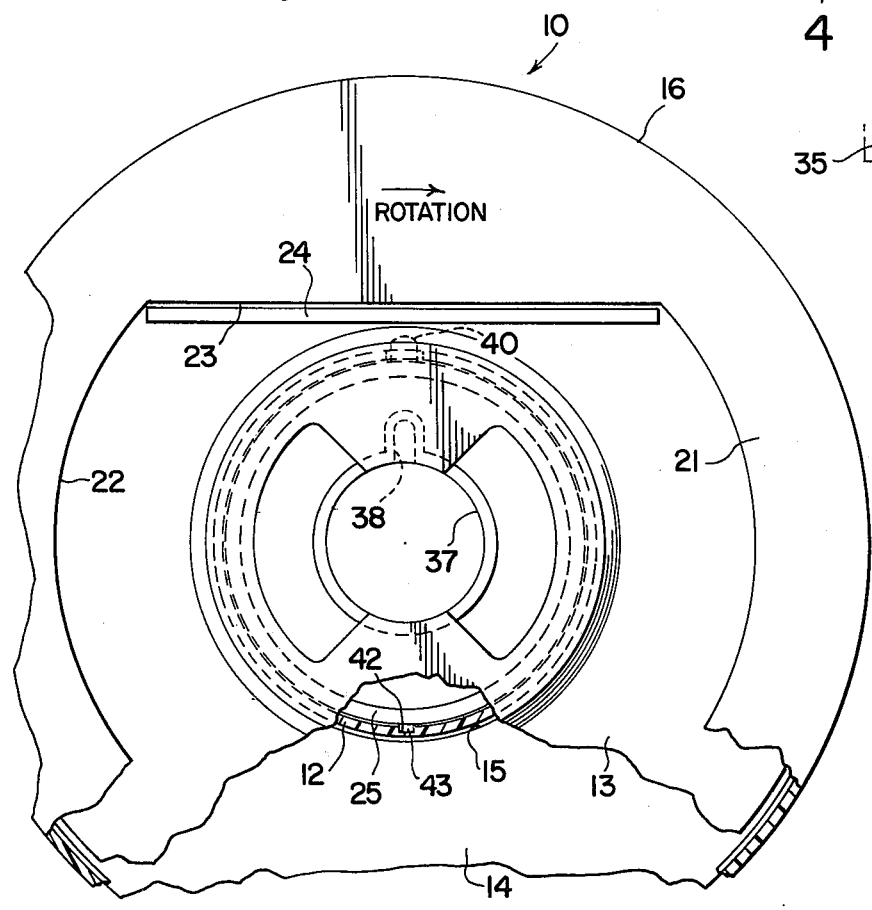
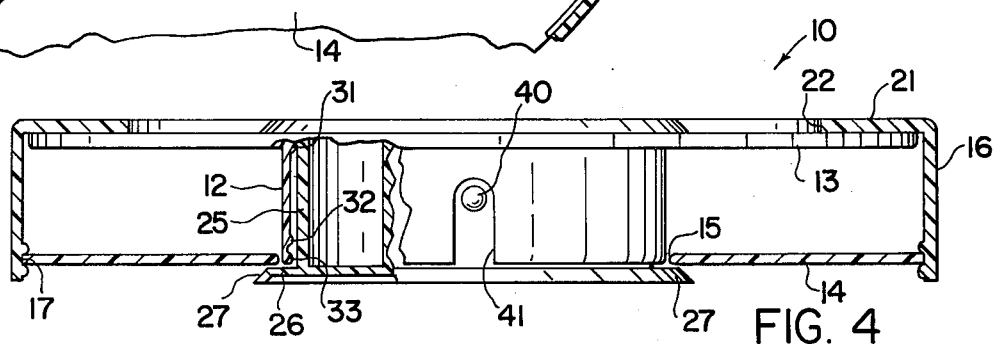

SELECTIVELY UNWINDING FILM REEL

CROSS REFERENCE TO RELATED APPLICATION

This application is a continuation-in-part of my earlier filed copending application Ser. No. 442,758, filed Feb. 14, 1975 now abandoned.

BACKGROUND OF THE INVENTION

This invention relates to storage reels for motion picture film and the like for use in association with motion picture cameras, movie projectors and the like, wherein the film is continuously fed or unwound from the reel or wound thereon. More particularly, the invention relates to a reel assembly with integral means for permitting the film wound on the reel to be unwound therefrom either beginning with the head end at the top or outside of the film windings or from the tail end on the inside or bottom of the windings.

Normally, motion picture film being viewed with a movie projector is fed from a supply reel through the working mechanism and then taken up and rewound on a take-up reel. Obviously, the film when rewound is in the reverse order with the tail end of the film at the top of the winding. Accordingly, it is necessary to rewind the film from the take-up reel back to another reel in order to view the film again. The rewinding operation is burdensome and time consuming even though the rewinding may be accomplished at a much faster speed than the speed used during the viewing of the film.

The reel assembly of the present invention, however, eliminates the difficulties described above and affords other features and advantages heretofore not obtainable.

SUMMARY OF THE INVENTION

It is among the objects of the invention to eliminate the need to rewind a strip of motion-picture film or the like after each viewing thereof.

Another object of the invention is to provide a reel assembly for strip material such as motion-picture film, which permits the film wound on the reel to be fed therefrom either from the outside of the windings or from the inside depending on whether the film is stored in the forward or reverse order.

These and other objects are accomplished with the unique reel assembly construction of the invention which comprises a tubular cylindrical hub with a fixed radial flange at one side and a removable cover adapted to fit over the radial flange and having a rim that surrounds the hub and film wound thereon. On the opposite side of the hub from the radial flange is a free annular side plate adapted to be removably seated in an annular groove inside the rim portion of the cover.

A film extraction drum is slidably received within the hub for movement in an axial direction between a retracted detent position tightly retained within the hub, and an axially extended position partially removed from within the hub. The film extraction drum has a fastening means thereon extending through a slot in the hub and adapted to engage and connect to the inside or tail end of film wound on the reel. Accordingly, when the extraction drum is moved to its extended position, it slides the inner end of the film outward therewith through the central opening in the free side plate so that the end of the film may be threaded through a desired mechanism and the film fed from the reel from the inside out, thus, eliminating the need to rewind the film after it is shown by a projectionist.

BRIEF DESCRIPTION OF THE DRAWINGS

FIG. 1 is a perspective view of a reel assembly embodying the invention with a strip of film wound thereon and being fed therefrom from the inside out, the film extraction drum being shown in its extended position in dashed lines and in its normal position in solid lines;

FIG. 2 is a sectional view on an enlarged scale (about twice actural size) taken on the line 2—2 of FIG. 1 and showing the reel in an empty condition;

FIG. 3 is a fragmentary sectional view with parts broken away, taken on the line 3—3 of FIG. 2;

FIG. 4 is a sectional view with parts broken away taken on the line 4—4 of FIG. 2;

DESCRIPTION OF THE PREFERRED EMBODIMENT

Figure 5:
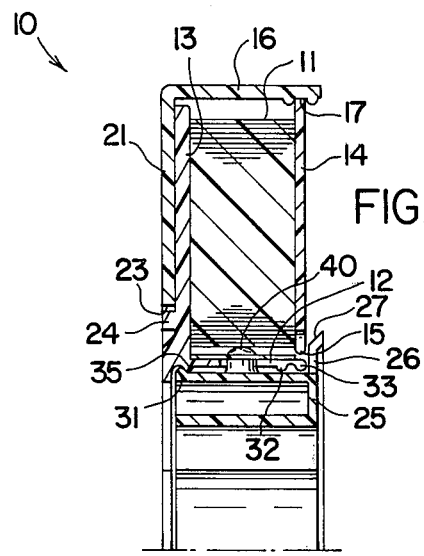
FIG. 5 is a fragmentary sectional view similar to FIG. 2 illustrating the condition of the reel assembly with the extraction drum within the reel hub and with a film strip wound conventionally around the hub.

Referring more particularly to the drawings, there is shown a film reel assembly 10 embodying the invention and adapted to have wound thereon a strip 11 of motion picture film. The film is wound around a hub 12 having an integral radial flange 13 at one side to guide and help retain the convolutions of film during the winding thereof. Located opposite the integral flange 13 is a free annular side plate 14 with a central opening 15 having a diameter somewhat greater than the diameter of the hub 12. An annular cover 16 fits over the integral flange 13 and the film wrapped on the hub 12 to protect and prevent unwinding of the film strip after it has been wound onto the hub 12. The cover 16 has an annular groove 17 formed therein, that provides a snug seat for the free side plate 14 which rests against the edges of the film strip 11 wound on the hub on the side thereof opposite the integral flange 13.

The cover 16 has an annular side wall 21 with a generally circular opening 22 therein but with a flattened portion 23. The flattened portion 23 is adapted to cooperate with a ridge 24 formed on the outward surface of the fixed flange 13 to prevent any relative rotary movement between the hub 12 and the cover 16.

Figure 6:
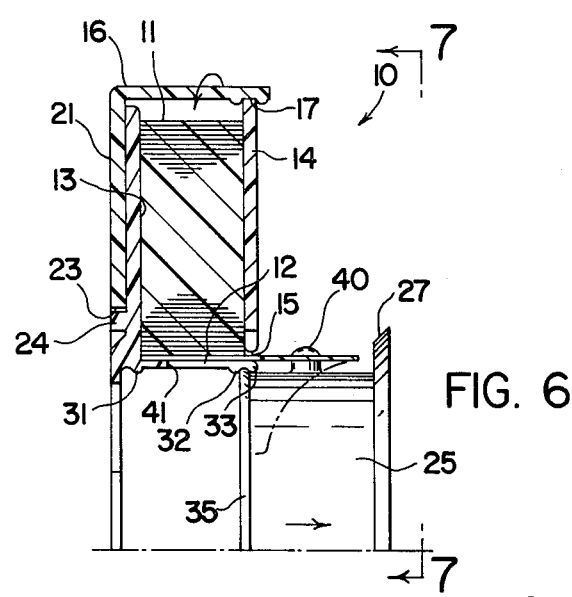
FIG. 6 is a fragmentary sectional view similar to FIG. 5 showing the extraction drum axially extended to move the tail end of the film strip laterally off of the hub.
Figure 8:
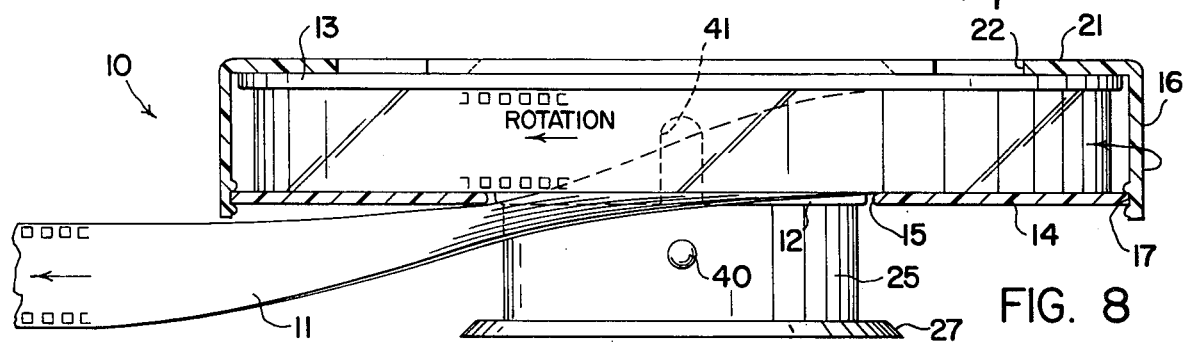
FIG. 8 is a sectional view taken on the line 8—8 of FIG. 7 showing the extraction drum extended.
Figure 9:
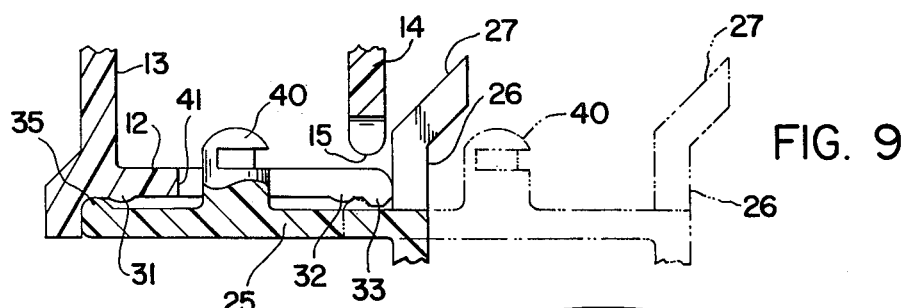
FIG. 9 is a sectional view on an enlarged scale illustrating the retracted (solid line) and extended (dashed line) positions of the extraction drum of the film reel assembly of the invention.
Figure 7:
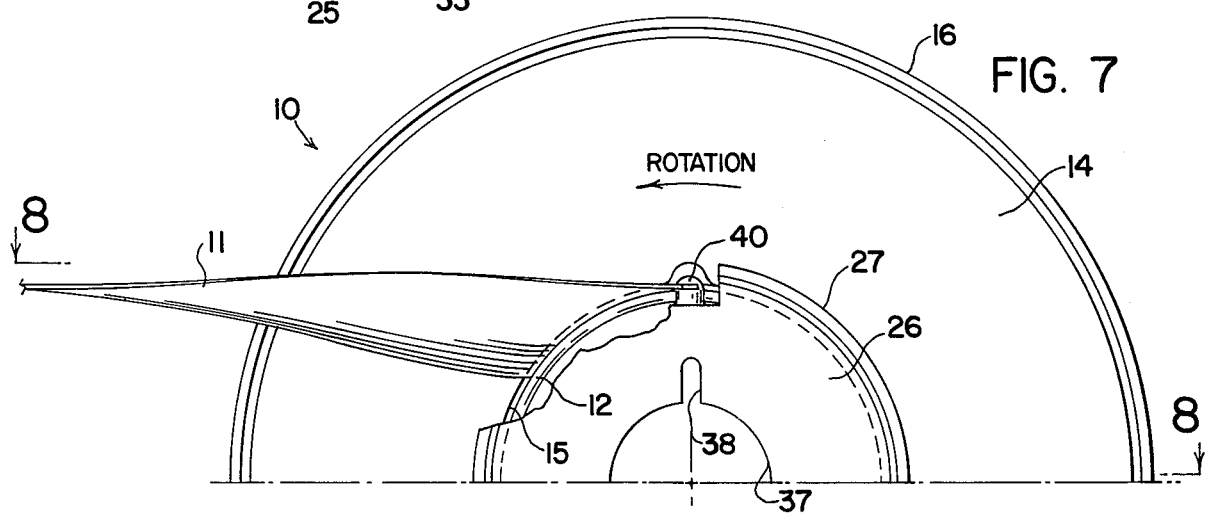
FIG. 7 is a fragmentary elevational view taken from the line 7—7 of FIG. 6.

Slidably received within the hub 12 is an extraction drum 25 that is axially movable between a retracted detent position illustrated in solid lines in FIGS. 1, 2, 4, 5 and 9 and an extended film extracting position illustrated in dashed lines in FIGS. 1, 2, and 9 and in solid lines in FIGS. 6 and 8. The extraction drum 25 has a radial flange 26 at its outward side which, when the drum 25 is in its retracted position, helps retain the free side plate in position against the film strip windings when the cover 16 is removed. The flange 26 has an outwardly flared conical rim portion 27 which serves as a guide for the film during unwinding in the manner described below.

The interior surface of the hub 12 has three annular ridges 31, 32 and 33 including a ridge 31 next to the fixed flange 13, that defines with the flange 13 an annular groove which provides a seat for an annular external rib 35 formed on the surface of the extraction drum 25. This provides a retracted detent position for the extraction drum 25. The two other annular ribs 32 and 33 which define a groove therebetween also adapted to tightly receive the external rib 35 of the extraction element to provide the extended detent position for the extraction drum 25.

It will be noted that the extraction drum 25 is normally not moved to its extended position unless the cover 16 is on the reel so that the free side plate 14 is held in place. The extraction drum 25 has a central opening 37 formed therein with a key slot 38 adapted to receive a spindle on which the reel assembly 10 is mounted for operation.

The extraction drum 25 has a film anchor pin 40 extending radially outward therefrom and through a slot 41 formed in the hub 12 to permit it to slide with the extraction drum 25 between its two positions. The pin 40 is adapted to receive and connect to the inner end of the film strip 11 to be wound onto the reel assembly. Normally the inner end of the film strip 11 is pressed against the pin 40 such that the pin pierces the film and thus retains it as shown in FIGS. 5 and 6. The hub 12 has an internal axially extending keyway 42 formed therein and adapted to slidably receive a key 43 formed in the outer surface of the extraction drum 25 (FIGS. 2 and 3). The key 43 and keyway 42 serve to fix the hub 12 rotationally to the extraction drum 25 when the drum 25 is in either of its positions.

Accordingly, once the film strip 11 is wound on the reel 10 conventionally with the forward or leading end of the film on the inside of the windings, the extraction drum 25 can be moved axially outward to the position illustrated in dashed lines in FIGS. 1 and 2 and in solid lines in FIGS. 6 and 8. This serves to slide the inside end of the film strip 11 outward with the drum 25 after which it may be pulled through the opening in the free side plate and extracted therefrom. Thus, the end of the film strip 11 may be unwound from the inside of the reel toward the outside, threaded through the projector and wound on another reel, the entire operation progressing from the inside to the outside of the windings and thus avoiding entirely any need to rewind the film strip 11 once it has been wound on the reel assembly 10 of the invention.

While the invention has been shown and described with respect to the preferred embodiment thereof, this is intended for the purpose of illustration rather than limitation and other variations and modifications of the specific embodiment herein shown and described will be apparent to those skilled in the art all within the intended spirit and scope of the invention. Accordingly, the patent is not to be limited in scope and effect to the specific embodiment herein shown and described nor in any other way that is inconsistent to which the progress in the art has been advanced by the invention.

I claim:

1. A reel assembly for flexible strip material comprising:
   a hub with a radial flange at one side,
   an annular cover adapted to enclose said hub and a length of strip material wrapped thereon,
   a free annular side plate on the opposite side of said hub from said radial flange said plate defining a central opening and being adapted to seat in said cover,
   a film extraction drum slidably received within said hub for axial movement between a retracted position within said hub and an axially extended position, and
   anchoring means on said film extraction drum extending through said hub and connectable to the tail end of the strip wound on said hub whereby when said film extraction drum is pulled axially outward to its extending position it slides the tail end of said strip wrapped on said hub away from said hub and permits the strip to be fed through the central opening in said side plate from the inside out.

2. A reel assembly as defined in claim 1 wherein said flexible strip material is motion picture film.

3. A reel assembly as defined in claim 1 wherein said anchoring means comprises a pin extending radially outward from said extraction drum and wherein said hub has a slot formed therein through which said pin extends, said pin being adapted to pierce the inner end of said strip material and retain said end thereon.

4. A reel assembly as defined in claim 1 including means keying said hub to said drum.

5. A reel assembly as defined in claim 4 wherein said keying means comprises an axially extending keyway formed in the inner surface of said hub and a cooperating key formed in the outer surface of said drum.

* * * * *